US012392420B2

United States Patent
Hosaka et al.

(10) Patent No.: US 12,392,420 B2
(45) Date of Patent: Aug. 19, 2025

(54) ELECTRIC VALVE

(71) Applicant: FUJIKOKI CORPORATION, Tokyo (JP)

(72) Inventors: Yuta Hosaka, Tokyo (JP); Bunta Narukawa, Tokyo (JP); Yuta Yasumoto, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 59 days.

(21) Appl. No.: 18/556,922

(22) PCT Filed: Mar. 22, 2022

(86) PCT No.: PCT/JP2022/013209
§ 371 (c)(1),
(2) Date: Oct. 24, 2023

(87) PCT Pub. No.: WO2022/230456
PCT Pub. Date: Nov. 3, 2022

(65) Prior Publication Data
US 2024/0218938 A1 Jul. 4, 2024

(30) Foreign Application Priority Data
Apr. 30, 2021 (JP) ................. 2021-077657

(51) Int. Cl.
*F16K 31/04* (2006.01)
*H02K 5/22* (2006.01)
*H02K 26/00* (2006.01)

(52) U.S. Cl.
CPC ........... *F16K 31/046* (2013.01); *H02K 5/225* (2013.01); *H02K 26/00* (2013.01)

(58) Field of Classification Search
USPC ....... 251/129.11, 129.12; 439/64, 77, 79, 80
See application file for complete search history.

(56) References Cited

U.S. PATENT DOCUMENTS 4,501,297 A * 2/1985 Baker ............... F16K 31/045
137/554
6,460,567 B1 * 10/2002 Hansen, III ............ F16K 31/04
137/625.48
(Continued)

FOREIGN PATENT DOCUMENTS

| JP | 2008-166382 A | 7/2008 |
| WO | 2019/064767 A1 | 4/2019 |
| WO | 2020/203007 A1 | 10/2020 |

OTHER PUBLICATIONS

International Search Report dated Apr. 26, 2022, for the corresponding patent application No. PCT/JP2022/013209, with English translation.

*Primary Examiner* — Matthew W Jellett
(74) *Attorney, Agent, or Firm* — LUCAS & MERCANTI, LLP

(57) ABSTRACT

An electric valve includes a motor, a power transmission mechanism that converts rotational movement generated by the motor into axial movement of a valve body, a housing that accommodates at least a part of the power transmission mechanism and the motor, an external connector that is provided to the housing and enables power supply to the motor and communication with a control device connected via a network, and a control substrate that is provided in the housing, processes the communication and controls the motor, and has a connection position connected to an external connector-side terminal and a connection position connected to a motor-side terminal disposed on opposite sides to each other with respect to the axis of the motor.

5 Claims, 4 Drawing Sheets

(56) References Cited

U.S. PATENT DOCUMENTS

| | | | |
|---|---|---|---|
| 6,561,480 B1* | 5/2003 | Komiya | F25B 41/347 |
| | | | 251/129.05 |
| 7,351,085 B2* | 4/2008 | Tamagawa | H01R 13/6658 |
| | | | 439/189 |
| 10,302,212 B2* | 5/2019 | Delannes | H01R 13/521 |
| 10,352,475 B2* | 7/2019 | Uehara | F16K 37/0041 |
| 11,913,565 B2* | 2/2024 | Hosoya | F25B 41/31 |
| 2003/0178004 A1* | 9/2003 | Keefover | F02D 9/107 |
| | | | 251/305 |
| 2008/0158830 A1 | 7/2008 | Tominaga et al. | |
| 2020/0172154 A1 | 6/2020 | Hattori et al. | |
| 2022/0196172 A1 | 6/2022 | Yoshida et al. | |
| 2024/0084914 A1* | 3/2024 | Yoshida | F16K 31/04 |

* cited by examiner

ELECTRIC VALVE

CROSS REFERENCE TO RELATED APPLICATION

This Application is a 371 of PCT/JP2022/013209 filed on Mar. 22, 2022, which claimed priority of Japanese Application No. 2021-077657 filed on Apr. 30, 2021, both of which are incorporated herein by reference.

TECHNICAL FIELD

The present disclosure relates to an electric valve.

BACKGROUND ART

WO 2020/203007 A discloses an electric valve which includes a motor including a stator member and a rotor member that displace a valve body, and a housing that accommodates the motor. The cover member of the housing holds a control substrate including a drive circuit that drives the motor. The tube-shaped member of the housing is provided with a connector portion (external connector) connectable to an external power source. The terminal disposed inside the connector portion is connected to the control substrate via the flexible board.

SUMMARY OF INVENTION

Technical Problem

As an example of a communication standard for reducing the cost of an in-vehicle network, Local Interconnect Network (LIN) has been developed. An electric valve used in an in-vehicle air conditioner is also equipped with a LIN communication function. Such an electric valve has a control substrate for processing LIN communication, and shares a power supply line, a ground line, and a communication line via a connector. In the electric valve, LIN communication is processed by a microcomputer such as an IC mounted on a control substrate to control energization of a motor inside the electric valve, whereby opening and closing of the valve are controlled.

In the conventional example described above, since the control substrate for LIN communication is not provided, the control substrate is installed near the external connector, and the external connector and the motor connector connecting the motor to the control substrate are disposed close to each other.

However, in a current electric valve having a LIN communication function, since a new motor connector (flexible board) is installed in the control substrate in the vicinity of the external connector, the IC or the like cannot be installed in the vicinity of the connector portion, and the IC or the like is installed at a position on the radially opposite side of the electric valve away from the external connector.

As a result, a signal (current) input from the external connector is processed by an IC or the like away from the external connector through, for example, the upper surface of the control substrate, then returns to the external connector side through, for example, the lower surface of the control substrate, and is provided to the motor via the flexible board. However, the presence of such a complicated electric path in the control substrate is a cause for receiving and transmitting noise. In addition, since the flexible board has flexibility, it is difficult to stabilize the electric path.

It is an object of the disclosure to improve noise performance in an electric valve having a communication function.

Solution to Problem

An electric valve according to a first mode includes: a motor: a power transmission mechanism that converts rotational movement generated by the motor into axial movement of a valve body: a housing that accommodates at least a part of the power transmission mechanism and the motor: an external connector that is provided to the housing and enables power supply to the motor and communication with a control device connected via a network: and a control substrate that is provided in the housing, processes the communication, and controls the motor, in which a connection position connected to an external connector-side terminal and a connection position connected to a motor-side terminal in the control substrate are each located on each of both end sides in a longitudinal direction of the control substrate.

The electric valve has a function of communication with a control device connected by a network, and a control substrate processes communication and controls a motor. In this control substrate, since the connection position connected to the external connector-side terminal and the connection position connected to the motor-side terminal are each located on each of both end sides in the longitudinal direction of the control substrate, the electric path from the external connector to the motor via the control substrate is simplified to one direction.

According to a second mode, in the electric valve according to the first mode, the control substrate includes a first substrate portion disposed in a direction intersecting an axis of the motor and connected to the external connector-side terminal, and a second substrate portion disposed in a direction along the axis of the motor and connected to the motor-side terminal, and the first substrate portion and the second substrate portion are coupled by a flex wiring portion that is thinner and more flexible than the first substrate portion and the second substrate portion.

In the electric valve, the control substrate includes a first substrate portion connected to the external connector-side terminal and a second substrate portion connected to the motor-side terminal, and the first substrate portion and the second substrate portion are coupled by a flex wiring portion. The flex wiring portion is thinner and more flexible than the first substrate portion and the second substrate portion. In other words, the first substrate portion and the second substrate portion are thicker and less flexible than the flex wiring portion. As compared with a case in which a member having flexibility as a whole such as a flexible board is connected to the motor-side terminal, the second substrate portion having relatively low flexibility is connected to the motor-side terminal, whereby reception and transmission of noise from the second substrate portion is suppressed.

Further, after the second substrate portion is connected to the motor-side terminal while being disposed in the direction along the axis of the motor, the flex wiring portion is bent to connect the first substrate portion to the external connector-side terminal, whereby the first substrate portion can be easily disposed in a direction intersecting the axis of the motor.

According to a third mode, in the electric valve according to the second mode, the external connector-side terminal and the motor-side terminal are press-fit terminals that are each press-fitted into each through hole provided in the control substrate.

In this electric valve, since the external connector-side terminal and the motor-side terminal are press-fit terminals and are each press-fitted into each through hole of the control substrate, the control substrate can be easily installed. In addition, since soldering is unnecessary, there is no concern about solder cracks and globules of solder, and improvement in reliability is expected. Further, at the same time as the process of bending the control substrate at the flex wiring portion, the first substrate portion can be connected to the external connector-side terminal.

According to a fourth mode, in the electric valve according to the second mode or the third mode, a gap that enables the first substrate portion to be gripped during assembly is provided between the first substrate portion and the housing.

In this electric valve, since a gap is provided between the first substrate portion and the housing, a process of gripping the first substrate portion by a tool (for example, a hand of an assembly robot) and connecting the first substrate portion to the external connector-side terminal can be easily performed.

Advantageous Effects of Invention

According to the disclosure, noise performance can be improved in an electric valve having a communication function.

DESCRIPTION OF EMBODIMENTS

Figure 1:
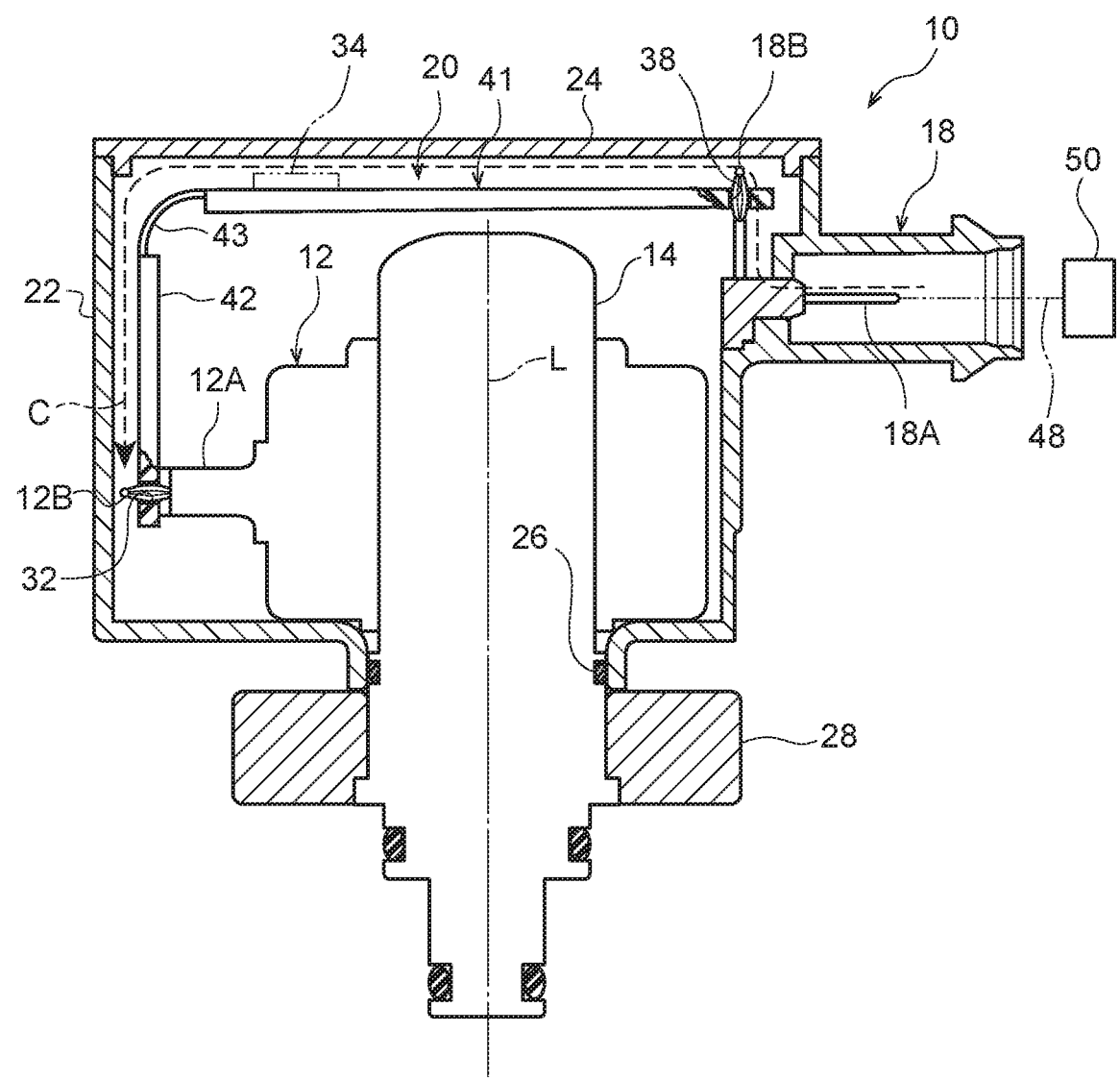
FIG. 1 is a cross-sectional view illustrating an electric valve according to the present embodiment.

Hereinafter, embodiments for carrying out the disclosure will be described with reference to the drawings. In the drawings, components denoted by the same reference numerals mean the same or similar components. Note that overlapping descriptions and reference numerals in the embodiments described below may be omitted. In addition, the drawings used in the following description are all schematic, and dimensional relationships of respective components, ratios of respective components, and the like illustrated in the drawings do not necessarily coincide with actual ones. In addition, dimensional relationships of the respective elements, ratios of the respective elements, and the like do not necessarily coincide among a plurality of drawings.

Figure 2:
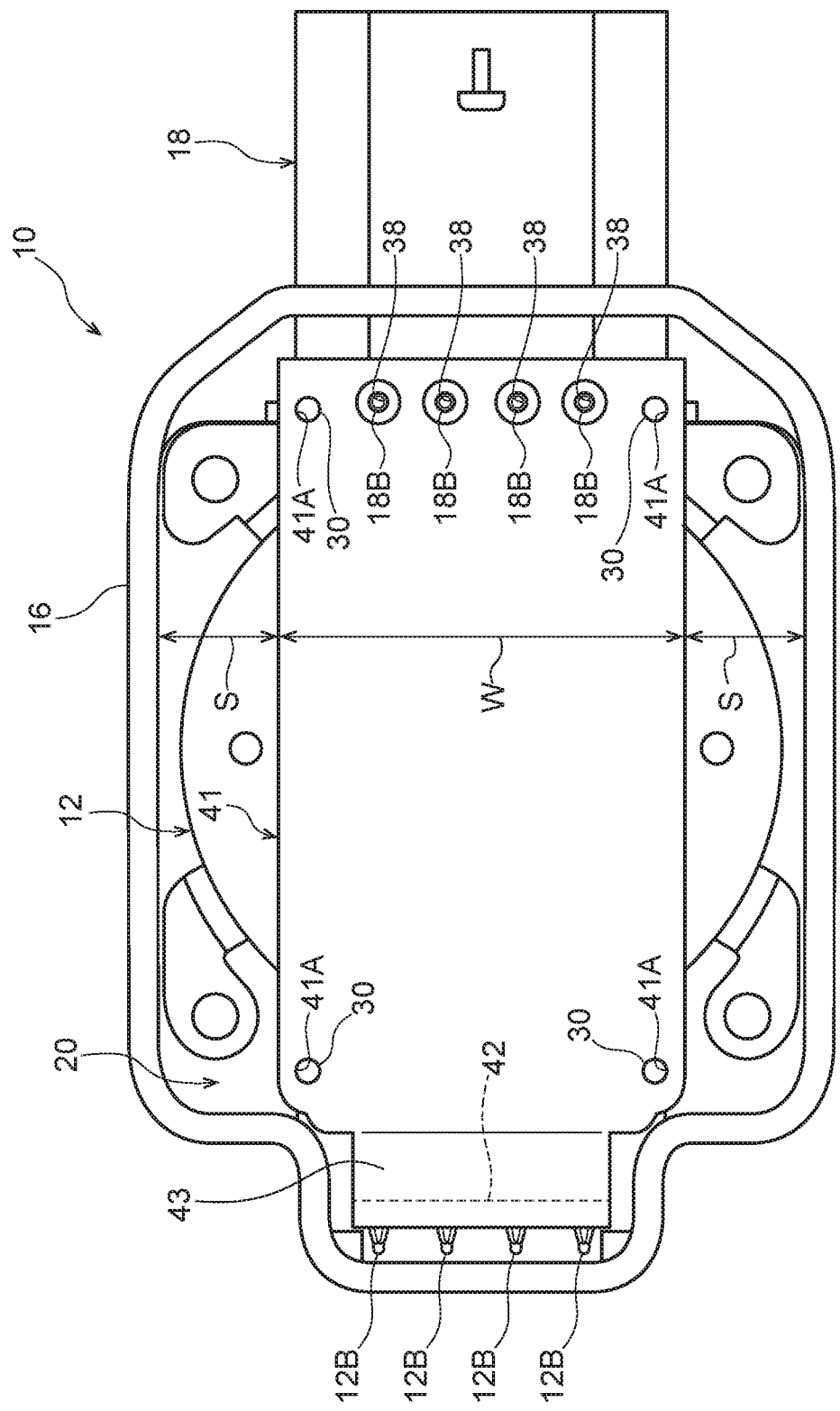
FIG. 2 is a plan view illustrating a state in which a cover member of a housing is removed to expose a control substrate in the electric valve according to the present embodiment.

In FIGS. 1 and 2, an electric valve 10 according to the present embodiment includes a motor 12, a power transmission mechanism 14, a housing 16, an external connector 18, and a control substrate 20. In FIG. 1, the axial direction of the power transmission mechanism 14 (axial direction of the motor) is defined as a vertical direction, and a lid body 24 of the housing 16 described later is located on the upper side. For convenience, the positional relationship of each member will be described with reference to this arrangement.

The motor 12 is, for example, a stepping motor. The power supply portion 12A of the motor 12 is provided with motor-side terminals 12B at, for example, four locations. The motor-side terminal 12B is, for example, a press-fit terminal, and is press-fitted into a through hole 32 provided in the control substrate 20. Since the structure of the motor 12 is known, other description will be omitted.

The power transmission mechanism 14 is a mechanism that converts rotational movement generated by the motor 12 into axial movement of a valve body (not illustrated). Since the structure of the power transmission mechanism 14 is known, other description will be omitted. Note that reference numeral 14 indicates a can that accommodates at least a part of the power transmission mechanism, and the can is not included in the power transmission mechanism 14.

The housing 16 is a member that houses at least a part of the power transmission mechanism 14 and the motor 12, and includes, for example, a cylindrical portion 22 and a lid body 24 for closing an upper end of the cylindrical portion 22. The housing 16 also houses a control substrate 20 and the like in addition to the motor 12 and the power transmission mechanism 14. For example, an O-ring 26 is disposed in a portion of the housing 16 in contact with the power transmission mechanism 14.

The power transmission mechanism 14 is provided with a mounting bracket 28 adjacent to the lower side of the housing 16. A lower base member having a flow path opened and closed by the electric valve 10 can be attached to a further lower side of the mounting bracket 28. The valve body driven by the electric valve 10 is disposed in the lower base member.

The external connector 18 is provided to the housing 16 and enables power supply to the motor 12 and communication, for example, LIN communication, with the control device 50 connected via a network 48. LIN is an example of an in-vehicle network. The external connector 18 is connected to the control device 50 via the network 48, and power is supplied to the control substrate 20 via the external connector 18. In FIG. 1, the external connector 18 extends horizontally from the housing 16. A terminal 18A disposed inside the external connector 18 is electrically connected to an external connector-side terminal 18B extending upward inside the housing 16. The external connector-side terminal 18B is, for example, a press-fit terminal, is provided at, for example, four locations, and press-fitted into a through hole 38 provided in the control substrate 20.

The control substrate 20 is provided in the housing 16, and is mounted with a microcomputer (electronic component 34 such as an IC) that processes communication, for example, LIN communication, with the control device 50, and controls the motor 12. In the control substrate 20, the connection position (through hole 38) connected to the external connector-side terminal 18B and the connection position (through hole 32) connected to the motor-side terminal 12B are each located on each of both end sides in the longitudinal direction of the control substrate 20. As an example, the connection position connected to the external connector-side terminal 18B and the connection position connected to the motor-side terminal 12B are disposed on opposite sides to each other with respect to the axis L of the motor 12. In the illustrated example, the connection position for connection of the control substrate 20 and the external connector-side terminal 18B is disposed on the right side of the axis L of the motor 12, and the connection position for connection of the control substrate 20 and the motor-side terminal 12B is disposed on the left side of the axis L of the motor 12.

Figure 3:
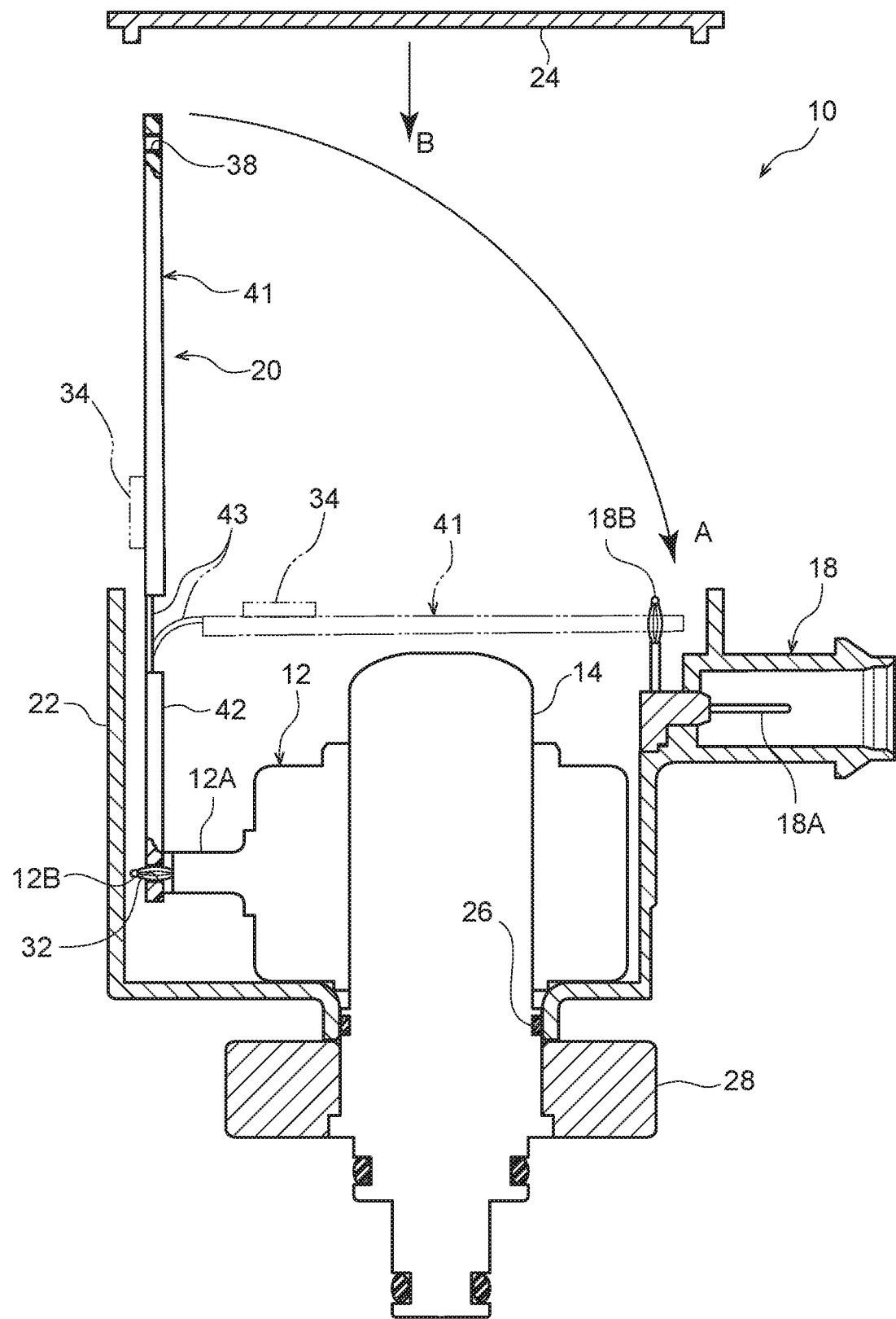
FIG. 3 is a cross-sectional view illustrating a process of installing a control substrate in the electric valve according to the present embodiment.

The control substrate 20 includes a first substrate portion 41, a second substrate portion 42, and a flex wiring portion 43. The first substrate portion 41 is disposed in a direction intersecting the axis L of the motor 12 and is connected to the external connector-side terminal 18B. The second substrate portion 42 is disposed in the direction along the axis L of the motor 12 and is connected to the motor-side terminal 12B. The flex wiring portion 43 is obtained by, for example, processing a part of the control substrate 20 to be thinner than the first substrate portion 41 and the second substrate portion 42, and has flexibility. The first substrate portion 41 and the second substrate portion 42 are coupled and integrated by a flex wiring portion 43. As illustrated in FIG. 3, the control substrate 20 before installation has a substantially flat plate shape as a whole because the flex wiring portion 43 has not been bent yet.

As illustrated in FIG. 2, positioning holes 41A are formed at, for example, four locations of the first substrate portion 41. The housing 16 is provided with bosses 30 at four locations for positioning, and the first substrate portion 41 is positioned and held by inserting the bosses 30 into the positioning holes 41A. By deforming the boss 30, the first substrate portion 41 may be prevented from being detached from the boss 30.

Between the first substrate portion 41 and the housing 16, a gap S that enables the first substrate portion 41 to be gripped at the time of assembly is provided. The gap S serves as a margin for gripping by a tool (not illustrated). The tool is, for example, a hand of an assembly robot. When the width W of the first substrate portion 41 is narrowed in order to provide the gap S, the mounting area of the electronic components is reduced. However, since the electronic components can also be mounted on the second substrate portion 42, the mounting area of the electronic components is sufficiently secured.

As illustrated in FIG. 3, when the control substrate 20 is installed to the electric valve 10, the entire control substrate 20 is erected in the vertical direction, and the motor-side terminal 12B is press-fitted into the through hole 32 of the second substrate portion 42. Next, the first substrate portion 41 is folded in the direction of the arrow A, and the external connector-side terminal 18B is press-fitted into the through hole 38 of the first substrate portion 41. At this time, the flex wiring portion 43 is bent. The boss 30 is inserted into the positioning hole 41A (FIG. 2). Then, the lid body 24 is attached to the cylindrical portion 22 (direction of arrow B) to close the upper end of the cylindrical portion 22.

(Operation)

The present embodiment is configured as described above, and the operation thereof will be described below: In FIG. 1, the electric valve 10 according to the present embodiment has a LIN communication function, and the control substrate 20 processes the LIN communication and controls the motor 12. In the control substrate 20, since the connection position (through hole 38) connected to the external connector-side terminal 18B and the connection position (through hole 32) connected to the motor-side terminal 12B are disposed on opposite sides to each other with respect to the axis L of the motor 12, the electric path from the external connector 18 to the motor 12 via the control substrate 20 is simplified to one direction (arrow C direction).

In the electric valve 10, the control substrate 20 includes a first substrate portion 41 connected to the external connector-side terminal 18B and a second substrate portion 42 connected to the motor-side terminal 12B, and the first substrate portion 41 and the second substrate portion 42 are coupled by a flex wiring portion 43. The flex wiring portion 43 is thinner and more flexible than the first substrate portion 41 and the second substrate portion 42. In other words, the first substrate portion 41 and the second substrate portion 42 are thicker and less flexible than the flex wiring portion 43. As compared with a case in which a member having flexibility as a whole such as a flexible board is connected to the motor-side terminal 12B, the second substrate portion 42 having relatively low flexibility is connected to the motor-side terminal 12B, whereby reception and transmission of noise from the second substrate portion 42 is suppressed.

Further, after the second substrate portion 42 is connected to the motor-side terminal 12B while being disposed in the direction along the axis L of the motor 12, the flex wiring portion 43 is bent to connect the first substrate portion 41 to the external connector-side terminal 18B, whereby the first substrate portion 41 can be easily disposed in a direction intersecting the axis L of the motor 12.

In this electric valve 10, since the external connector-side terminal 18B and the motor-side terminal 12B are press-fit terminals and are press-fitted into the through holes 38 and 32 of the control substrate 20, respectively, the control substrate 20 can be easily installed. In addition, since soldering is unnecessary, there is no concern about solder cracks and globules of solder, and improvement in reliability is expected. Further, at the same time as the process of bending the control substrate 20 at the flex wiring portion 43, the first substrate portion 41 can be connected to the external connector-side terminal 18B.

As illustrated in FIG. 2, since the gap S is provided between the first substrate portion 41 and the housing 16, a process of gripping the first substrate portion by a tool (for example, a hand of an assembly robot) and connecting the first substrate portion 41 to the external connector-side terminal 18B can be easily performed.

As described above, according to the present embodiment, the noise performance can be improved in the electric valve 10 having a communication function.

OTHER EMBODIMENTS

Although an example of the embodiment of the disclosure has been described above, the embodiment of the disclosure is not limited to the above, and it is a matter of course that various modifications can be made without departing from the gist of the present disclosure in addition to the above.

In the embodiment, the control substrate 20 includes the first substrate portion 41, the second substrate portion 42, and the flex wiring portion 43, but the configuration of the control substrate 20 is not limited thereto. Any suitable configuration may be used as long as in the control substrate 20, the connection position connected to the external connector-side terminal 18B and the connection position connected to the motor-side terminal 12B are disposed on opposite sides with respect to the axis L of the motor 12. Although LIN has been described as an example of the in-vehicle network, the in-vehicle network is not limited thereto, and may be CAN or the like.

Figure 4:
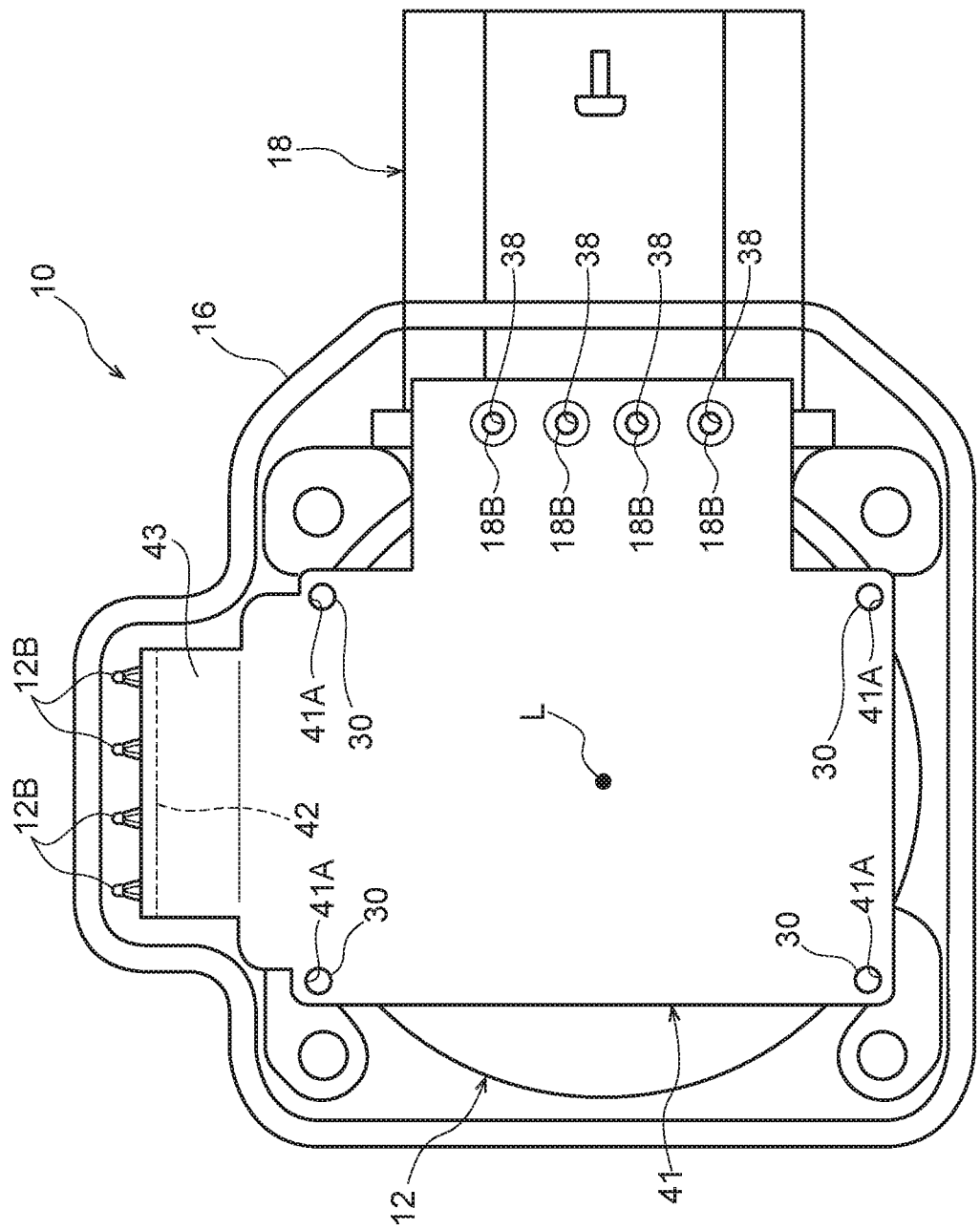
FIG. 4 is a plan view illustrating a state in which a cover member of a housing is removed to expose a control substrate in an electric valve according to a modification.

As in the modification illustrated in FIG. 4, in the control substrate 20, the connection position connected to the external connector-side terminal 18B and the connection position connected to the motor-side terminal 12B may be disposed on sides different from each other by 90° with respect to the axis L of the motor 12. That is, both the connection positions may be disposed at any suitable locations as long as both the connection positions are not disposed on the same side with respect to the axis L of the motor 12.

Although press-fit terminals are used as the external connector-side terminal 18B and the motor-side terminal 12B, a configuration in which connection is carried out by soldering without using a press-fit terminal is acceptable.

Although the gap S serving as a margin for gripping by a tool is provided between the first substrate portion 41 and the housing 16, the gap S is not necessarily provided.

The entire disclosure of Japanese Patent Application No. 2021-77657 filed on Apr. 30, 2021 is incorporated herein by reference.

All the documents, patent applications, and technical standards cited in this specification are incorporated herein by reference to the same extent as when each individual document, patent application, or technical standard is specifically and individually indicated to be incorporated by reference.

The invention claimed is:

1. An electric valve comprising:
a motor;
a power transmission mechanism that converts rotational movement generated by the motor into axial movement of a valve body;
a housing that accommodates at least a part of the power transmission mechanism and the motor;
an external connector that is provided at the housing and enables power supply to the motor and communication with a control device connected via a network; and
a control substrate that is provided in the housing, processes the communication, and controls the motor,
wherein a connection position at which the control substrate is connected to an external connector-side terminal and a connection position at which the control substrate is connected to a motor-side terminal are respectively located on both end sides in a longitudinal direction of the control substrate,
the control substrate includes a first substrate portion disposed in a direction intersecting an axis of the motor and connected to the external connector-side terminal, a second substrate portion disposed in a direction along the axis of the motor and connected to the motor-side terminal, and a flex wiring portion that couples the first substrate portion and the second substrate portion, the flex wiring portion being thinner and more flexible than the first substrate portion and the second substrate portion, and
the control substrate including the first substrate, the second substrate, and the flex wiring portion is formed as a substantially flat plate, the flex wiring portion being bent during installation so that the first substrate portion is disposed in the direction intersecting an axis of the motor and the second substrate portion is disposed in the direction along the axis of the motor.

2. The electric valve according to claim 1, wherein the external connector-side terminal and the motor-side terminal are press-fit terminals that are respectively press-fitted into through holes provided at the control substrate.

3. The electric valve according to claim 1, wherein a gap that enables the first substrate portion to be gripped during assembly is provided between the first substrate portion and the housing.

4. The electric valve according to claim 2, wherein a gap that enables the first substrate portion to be gripped during assembly is provided between the first substrate portion and the housing.

5. The electric valve according to claim 1, wherein the flex wiring portion is obtained by processing a part of the control substrate to be thinner than the first substrate portion and the second substrate portion.

* * * * *